(12) United States Patent
van Kampen et al.

(10) Patent No.: US 7,633,970 B2
(45) Date of Patent: Dec. 15, 2009

(54) MAC HEADER COMPRESSION FOR USE WITH FRAME AGGREGATION

(75) Inventors: Harald van Kampen, Utrecht (NL); Richard van Leeuwen, Zoetermeer (NL)

(73) Assignee: Agere Systems Inc., Allentown, PA (US)

( * ) Notice: Subject to any disclaimer, the term of this patent is extended or adjusted under 35 U.S.C. 154(b) by 823 days.

(21) Appl. No.: 11/019,581

(22) Filed: Dec. 22, 2004

(65) Prior Publication Data
US 2005/0249222 A1    Nov. 10, 2005

Related U.S. Application Data

(60) Provisional application No. 60/569,313, filed on May 7, 2004.

(51) Int. Cl.
*H04J 3/24* (2006.01)
(52) U.S. Cl. .................................... 370/473; 370/474
(58) Field of Classification Search ........................ None
See application file for complete search history.

(56) References Cited

U.S. PATENT DOCUMENTS

| | | | | |
|---|---|---|---|---|
| 4,727,536 A | * | 2/1988 | Reeves et al. | 370/468 |
| 5,467,342 A | * | 11/1995 | Logston et al. | 370/253 |
| 5,583,859 A | * | 12/1996 | Feldmeier | 370/471 |
| 6,041,051 A | | 3/2000 | Doshi et al. | |
| 6,236,647 B1 | | 5/2001 | Amalfitano | 370/335 |
| 6,317,430 B1 | | 11/2001 | Knisely et al. | |

(Continued)

FOREIGN PATENT DOCUMENTS

EP    0 912 016 A2    4/1999

(Continued)

OTHER PUBLICATIONS

"Energy Saving in IEEE 802.11 Communications Using Frame Aggregation," by Jean Lorchat et al., Globecom 2003, IEEE Global Telecommunications Conference. Conference Proceedings, San Francisco, Dec. 1-5, 2003, IEEE Global Telecommunications Conference, New York, NY, IEEE, US, vol. 7 of 7, pp. 1296-1300, XP010677504.

(Continued)

*Primary Examiner*—Hong Cho
*Assistant Examiner*—Eunsook Choi
(74) *Attorney, Agent, or Firm*—Mendelsohn, Drucker & Associates, P.C.; Yuri Gruzdkov; Steve Mendelsohn

(57) ABSTRACT

A method of generating an aggregate frame having a header unit, which carries MAC-header information applicable to one or more data units of said aggregate frame. Since each data unit of the aggregate frame no longer needs to carry the full MAC-header information, the overhead associated with the MAC header can be significantly reduced. At the receiver, the full MAC header corresponding to the data unit is reconstructed by (i) matching the appropriate header and data units to one another and (ii) combining the information present in the header unit and the compressed header portion of the data unit. Embodiments of the present invention are capable of improving the data throughput, for example, in an entertainment network having paired source and destination devices (e.g., a DVD player and an LCD screen) with a relatively large amount of data streamed from the former to the latter.

35 Claims, 6 Drawing Sheets

U.S. PATENT DOCUMENTS

| | | |
|---|---|---|
| 6,452,946 B1 | 9/2002 | Manzardo ............. 370/487 |
| 6,594,278 B1 * | 7/2003 | Baroudi ............. 370/466 |
| 6,614,808 B1 | 9/2003 | Gopalakrishna ............. 370/469 |
| 6,640,248 B1 | 10/2003 | Jorgensen |
| 6,775,804 B1 | 8/2004 | Dawson ............. 714/776 |
| 6,859,501 B1 | 2/2005 | Zimmermann et al. ............. 375/260 |
| 6,865,163 B1 | 3/2005 | Bergenwall et al. ............. 370/288 |
| 6,877,043 B2 | 4/2005 | Mallory et al. ............. 709/251 |
| 6,928,289 B1 | 8/2005 | Cho et al. ............. 455/452.2 |
| 6,987,770 B1 | 1/2006 | Yonge, III ............. 370/401 |
| 7,139,283 B2 * | 11/2006 | Quigley et al. ............. 370/432 |
| 7,231,530 B1 | 6/2007 | Miller et al. ............. 713/320 |
| 7,298,691 B1 | 11/2007 | Yonge, III et al. ............. 370/203 |
| 7,492,789 B2 * | 2/2009 | Shvodian ............. 370/469 |
| 2001/0024435 A1 * | 9/2001 | Birdwell et al. ............. 370/349 |
| 2002/0093928 A1 | 7/2002 | LoGalbo et al. ............. 370/336 |
| 2002/0110148 A1 | 8/2002 | Hickman et al. ............. 370/475 |
| 2002/0147025 A1 | 10/2002 | Savas ............. 455/522 |
| 2002/0167962 A1 * | 11/2002 | Kowalski ............. 370/445 |
| 2003/0058862 A1 * | 3/2003 | Lansing et al. ............. 370/392 |
| 2003/0086366 A1 * | 5/2003 | Branlund et al. ............. 370/208 |
| 2003/0128706 A1 | 7/2003 | Mark et al. ............. 370/395.1 |
| 2003/0135640 A1 | 7/2003 | Ho et al. ............. 709/237 |
| 2003/0169769 A1 * | 9/2003 | Ho et al. ............. 370/473 |
| 2003/0171114 A1 | 9/2003 | Hastings ............. 455/426.2 |
| 2004/0052273 A1 | 3/2004 | Karaoguz et al. ............. 370/465 |
| 2004/0141460 A1 | 7/2004 | Holtzman et al. ............. 370/216 |
| 2004/0141525 A1 | 7/2004 | Bhushan et al. ............. 370/473 |
| 2004/0180696 A1 | 9/2004 | Foore et al. ............. 455/561 |
| 2004/0240424 A1 | 12/2004 | Fong et al. ............. 370/349 |
| 2005/0053037 A1 | 3/2005 | Ginzburg et al. ............. 370/333 |
| 2005/0114489 A1 | 5/2005 | Yonge et al. ............. 709/223 |
| 2005/0286523 A1 | 12/2005 | Liao et al. ............. 370/389 |
| 2007/0101020 A1 | 5/2007 | Lin et al. ............. 709/238 |

FOREIGN PATENT DOCUMENTS

| | | |
|---|---|---|
| EP | 0 987 842 A1 | 3/2000 |
| GB | 2 315 694 A | 2/1998 |
| GB | 2 315 964 A | 2/1998 |
| JP | 2000-295313 | 10/2000 |
| WO | WO 99/63703 | 12/1999 |
| WO | WO 02/05453 A2 | 1/2002 |
| WO | WO 2004/039011 A2 | 5/2004 |

OTHER PUBLICATIONS

"Data Link Frame Aggregation Protocol," by J. Michael Meehan et al., International Conference O-N Computers and Their Applications, Proceedings of ISCA Cata, Apr. 4, 2006, San Francisco, CA, pp. 1-4, XP009044947.

"Optimum Sub-packet Transmission for Turbo-coded Hybrid ARQ Systems", by Y.Q. Zhou and J. Wang, IEEE 2003, pp. 3080-3084.

"Transmission of High Speed Data in cdma 2000", N. Guo et al., IEEE 1999, pp. 1442-1445.

* cited by examiner

MAC HEADER COMPRESSION FOR USE WITH FRAME AGGREGATION

CROSS-REFERENCE TO RELATED APPLICATIONS

This application claims priority from U.S. Provisional Patent Application No. 60/569,313 filed May 7, 2004, and entitled "MAC Header Compression Mechanism That Increases Wireless Medium Efficiency When Combined with Frame Aggregation." The subject matter of this application is related to that of (i) U.S. patent application Ser. No. 10/955,947, filed Sep. 30, 2004, and entitled "Frame Aggregation Format" and (ii) U.S. patent application Ser. No. 10/955,943, filed Sep. 30, 2004, and entitled "Frame Aggregation," both of which are incorporated herein by reference.

BACKGROUND OF THE INVENTION

1. Field of the Invention

The present invention relates to communication equipment and, more specifically, to equipment for wireless local area networks (WLANs).

2. Description of the Related Art

A typical WLAN system may include one or more stations (STAs), e.g., a cell phone, a laptop computer, and/or a hand-held computer, each of which is equipped with a generally available WLAN PC card. WLAN PC cards enable STAs to communicate among themselves (i) directly, when located within the same service area, and/or (ii) indirectly, through a network server, when located in different service areas. The network server provides support for communication between STAs in different service areas through the access points (APs) located in those service areas. A basic service set (BSS) is formed between the STAs or between an AP and one or more STAs within the same service area.

One example of a WLAN network is a network that conforms to standards developed and proposed by the Institute of Electrical and Electronic Engineers (IEEE) 802.11 Committee (referred to herein as a network operating in accordance with the IEEE 802.11 family of standards), which standards are incorporated herein by reference. In an 802.11 WLAN network, all messages transmitted among different STAs of the same service area are typically transmitted via the AP rather than being transmitted directly between the STAs. Such centralized wireless communication provides significant advantages in terms of simplicity of the communication link as well as in power savings. However, if necessary or appropriate, an 802.11 WLAN network can also be configured to transmit messages directly between two STAs in a so-called IBSS (independent basic service set) mode.

Most WLAN networks are organized as a series of layers (a layered-network architecture), each layer built upon its predecessor. The purpose of each lower layer is to offer services to the higher layer(s) and, at the same time, shield those higher layers from implementation details of the lower layer(s). Between each pair of adjacent layers is an interface that defines those services. The lowest layers are the data link and physical layers. The function of the data link layer is to partition input data into data frames and transmit the frames over the physical layer sequentially. Each data frame includes a header that contains control and sequence information for the frames. The function of the physical layer is to transfer information over a communication medium.

FIG. 1 shows a prior-art framing sequence for user data in a representative 802.11-compliant WLAN. More specifically, six protocol layers are shown in FIG. 1: an application layer 150, a transmission control protocol (TCP) layer 151, an Internet protocol (IP) layer 152, a logical link control (LLC) layer 153 (a sub-layer in the data link layer), a medium access control (MAC) layer 154 (also a sub-layer in the data link layer), and a physical (PHY) layer 155. User data 101 are provided to application layer 150, which generates application data 102 by appending an application-layer header 110 to the user data. Application data 102 are provided to TCP layer 151, which appends a TCP header 111 to application data 102 to form a TCP segment 103. IP layer 152 appends an IP header 112 to TCP segment 103 to form an IP frame 104. IP frame 104 might be a typical TCP/IP packet that is commonly employed in many data networking applications including some that are not necessarily 802.11-compliant. LLC layer 153 provides a uniform interface between MAC layer 154 and the higher layers, thereby providing transparency of the type of WLAN used to transport the TCP/IP packet. LLC layer 153 appends the interface information as an LLC header 113 to IP frame 104 to form an LLC frame 105.

In an 802.11-compliant WLAN, the physical device is a radio and the physical communication medium is free space. A MAC device and a PHY-layer signaling control device ensure that two WLAN terminals are communicating with the correct frame format and protocol. The IEEE 802.11 standard for WLANs defines the communication protocol between two (or more) peer PHY devices as well as between the associated peer MAC devices. According to the 802.11 WLAN data communication protocol, each packet frame transferred between the MAC device and the PHY device has a PHY header, a MAC header, MAC data, and error checking fields.

A typical format for the MAC-layer frame of an 802.11-compliant WLAN system appends a MAC header 114 and a frame check sequence (FCS) 115 to LLC frame 105 to form a MAC frame 106. MAC header 114 includes frame control, duration identification (ID), source and destination addresses, and data sequence control (number) fields. The data sequence control field provides sequence-numbering information that allows a receiver to reconstruct a user data stream from a sequence of MAC frames. PHY layer 155 forms a physical-layer packet frame 107 by appending a PHY header 118 to MAC frame 106. PHY header 118 includes a preamble 116 and a physical-layer convergence protocol (PLCP) header 117. PLCP header 117 identifies, for example, the data rate and length in PHY layer 155, and preamble 116 might be used by a receiving device to (i) detect/synchronize to the incoming frame and (ii) estimate the channel characteristics between the transmitter and receiver.

The effective data throughput or efficiency of the IEEE 802.11 WLAN protocol is impacted by several sources of overhead. For example, the overhead can originate at the PHY layer (e.g., preamble 116 and PLCP header 117) and the MAC layer (e.g., MAC header 114, FCS 115, acknowledgement (ACK) frames, inter-frame spacing (IFS), and contention overhead). Some improvements in the efficiency have been achieved in the IEEE 802.11e enhancements for Quality of Service (QoS) by incorporating mechanisms for frame bursting and block acknowledgement (Block-ACK), which tend to reduce the overhead associated with ACK frames, the IFS, and contention. However, it may still be desirable to further reduce the overhead by targeting other overhead sources.

SUMMARY OF THE INVENTION

Problems in the prior art are addressed, in accordance with the principles of the present invention, by a method of generating an aggregate frame having a header unit, which carries MAC-header information applicable to one or more data units of said aggregate frame. Since each data unit of the aggregate frame no longer needs to carry the full MAC-header information, the overhead associated with the MAC header can be significantly reduced. At the receiver, the full MAC header corresponding to the data unit is reconstructed by (i) matching the appropriate header and data units to one another and (ii) combining the information present in the header unit and the compressed header portion of the data unit. Embodiments of the present invention are capable of improving the data throughput, for example, in an entertainment network having paired source and destination devices (e.g., a DVD player and an LCD screen) with a relatively large amount of data streamed from the former to the latter.

According to one embodiment, the present invention is a method of generating an aggregate frame for one or more sub-frames, the method comprising: (a) generating a header unit from headers of a first set from said one or more sub-frames, the header unit having header information applicable to each sub-frame in the first set; (b) for each sub-frame in the first set, generating a data unit having a compressed header portion and a payload data portion; and (c) forming the aggregate frame containing the generated header and data units.

According to another embodiment, the present invention is a method of processing a packet by a receiving device, the method comprising: receiving a packet having an aggregate frame corresponding to one or more sub-frames, wherein: the aggregate frame comprises a header unit and, for each sub-frame, a data unit; the header unit has header information applicable to the one or more sub-frames; and the data unit has a compressed header portion and a payload data portion; and based on the header unit and the data unit, reconstructing the corresponding sub-frame of the one or more sub-frames.

BRIEF DESCRIPTION OF THE DRAWINGS

Other aspects, features, and benefits of the present invention will become more fully apparent from the following detailed description, the appended claims, and the accompanying drawings in which:

DETAILED DESCRIPTION

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments.

The above-cited '947 and '943 applications address the problems in the prior art by proposing a frame aggregation mechanism. More specifically, frame aggregation is used to combine several separate higher-layer frames having user data into one PHY-level frame, thereby increasing the amount of user data per PHY frame transmitted. Several frames might be aggregated for: (A) frames having the same destination address and the same PHY-layer data rate, (B) frames having one or more destination addresses and the same PHY-layer data rate, and (C) frames having one or more destination addresses with each frame having one of several possible PHY-layer data rates. Frame aggregation improves the efficiency by reducing both PHY overhead (e.g., preambles and PLCP header overhead) and MAC overhead (e.g., contention overhead).

Figure 1:
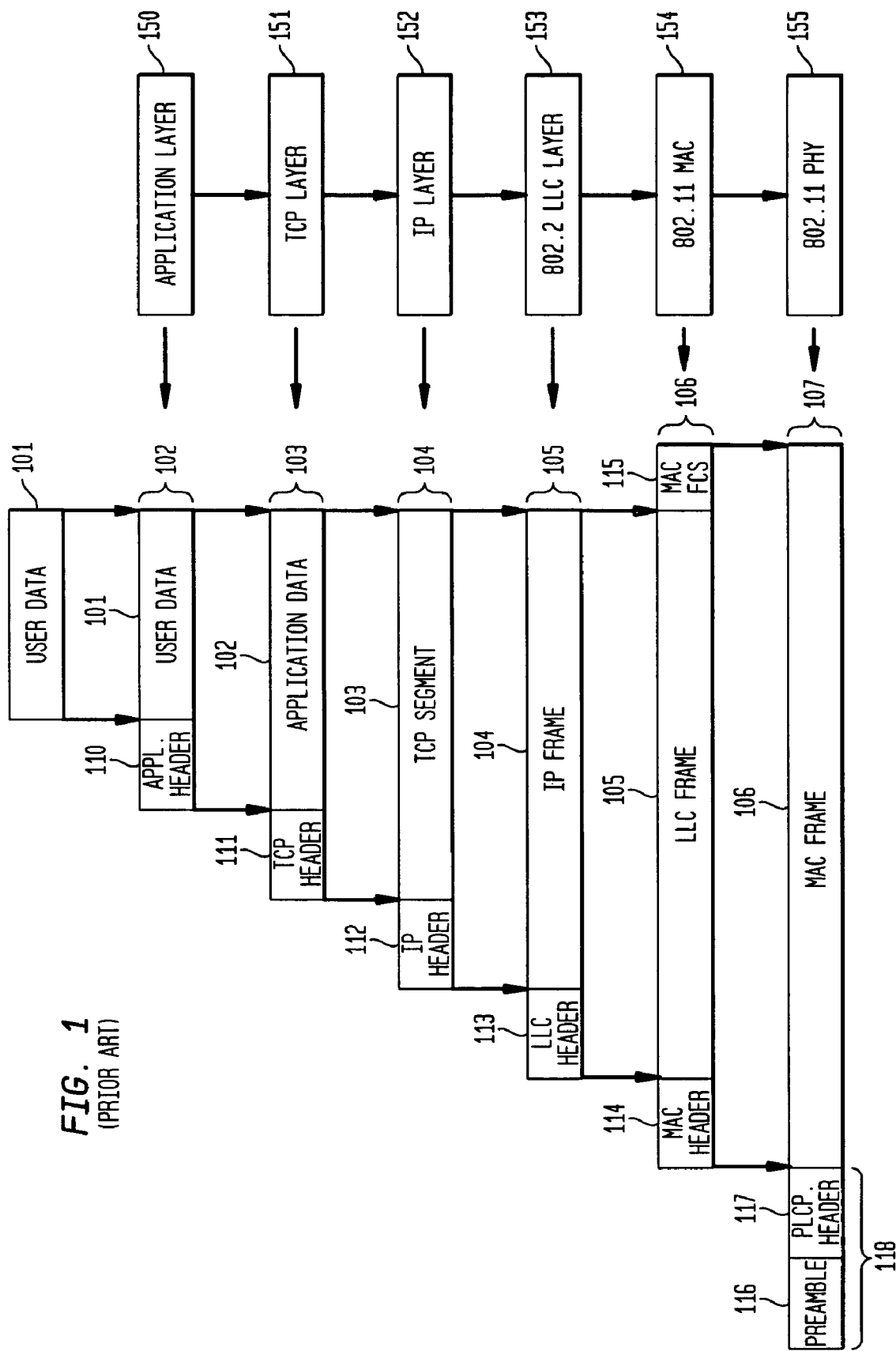
FIG. 1 shows a prior art framing sequence for user data in accordance with an 802.11 wireless local area network (WLAN) standard.
Figure 2:
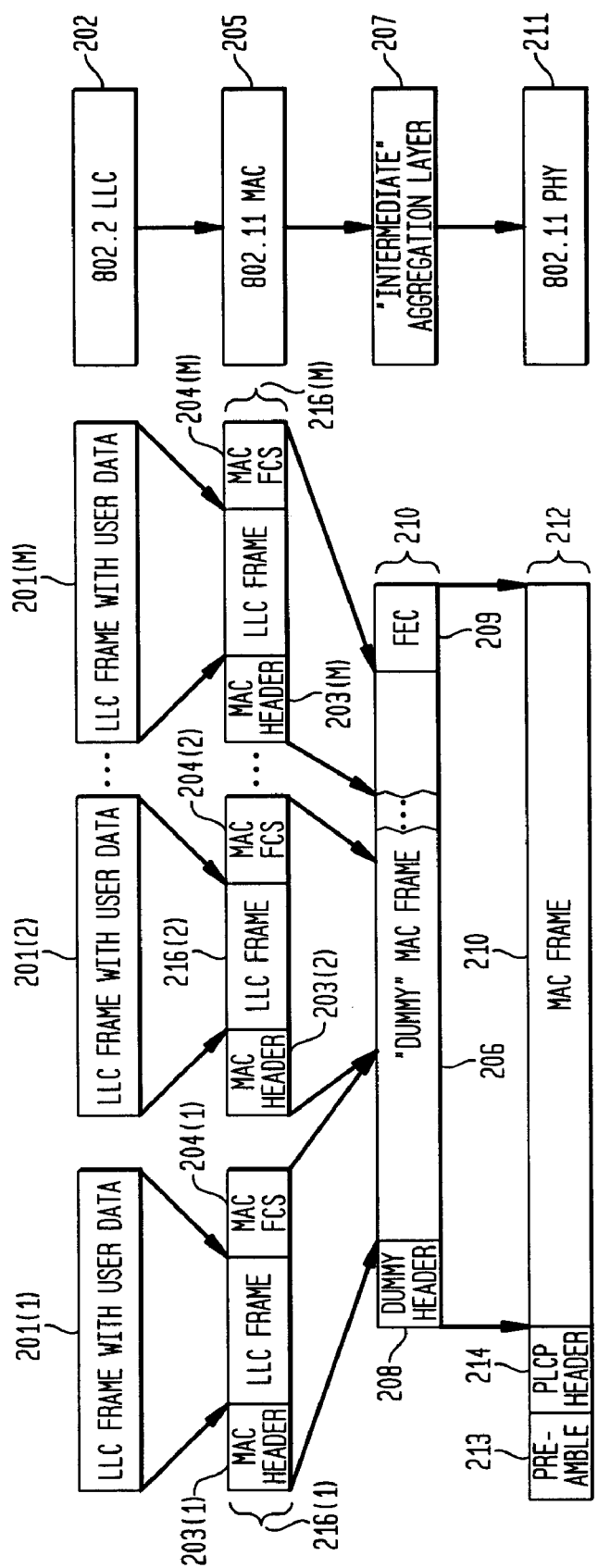
FIG. 2 shows one exemplary frame aggregation method.

FIG. 2 shows one exemplary frame aggregation method disclosed in the '947 and '943 applications. More specifically, frame aggregation of FIG. 2 is performed below MAC layer 205 by forming several MAC frames into a dummy MAC frame before the latter is processed by PHY layer 211. Frame aggregation below the MAC layer enables verification of each LLC frame independently of the other frames since each MAC frame has error-detection information, such as a frame checksum, in an error-control field, such as an FCS field, appended to the LLC frame. In addition, since separate MAC frames are each sent with their own header and destination address information, the MAC frames can be sent to different destinations.

LLC frames 201(1) through 201(M), M a positive integer, at LLC layer 202, are passed to MAC layer 205. Each LLC frame 201(n) ($1 \leq n \leq M$) is formed into a MAC sub-frame 216(n) by appending a MAC header 203(n) and a MAC FCS 204(n). MAC sub-frames 216(1) through 216(M) are then combined into a dummy MAC frame 206. Intermediate aggregation layer 207 then appends optional (i) dummy header 208 and/or (ii) forward error correction/detection (FEC) field 209 to dummy MAC frame 206 to form an aggregate MAC frame 210. PHY layer 211 forms a PHY packet 212 from aggregate MAC frame 210 by appending a preamble 213 and a PLCP header 214.

Dummy header 208 might be employed to indicate the number (e.g., M) and size (i.e., length) of MAC sub-frames 216(1) through 216(M) included in dummy MAC frame 206. FEC field 209 might be employed to correct bit errors at the receiver to increase the probability of correct reception of any of MAC sub-frames 216(1) through 216(M). Alternatively, multiple FEC fields might be employed, either appended at one end of dummy MAC frame 206 or within each of MAC frames 216(1) through 216(M). When different MAC sub-frames have different destinations, a modified acknowledgment method (e.g., delayed-ACK message exchange) might be employed.

Figure 3:
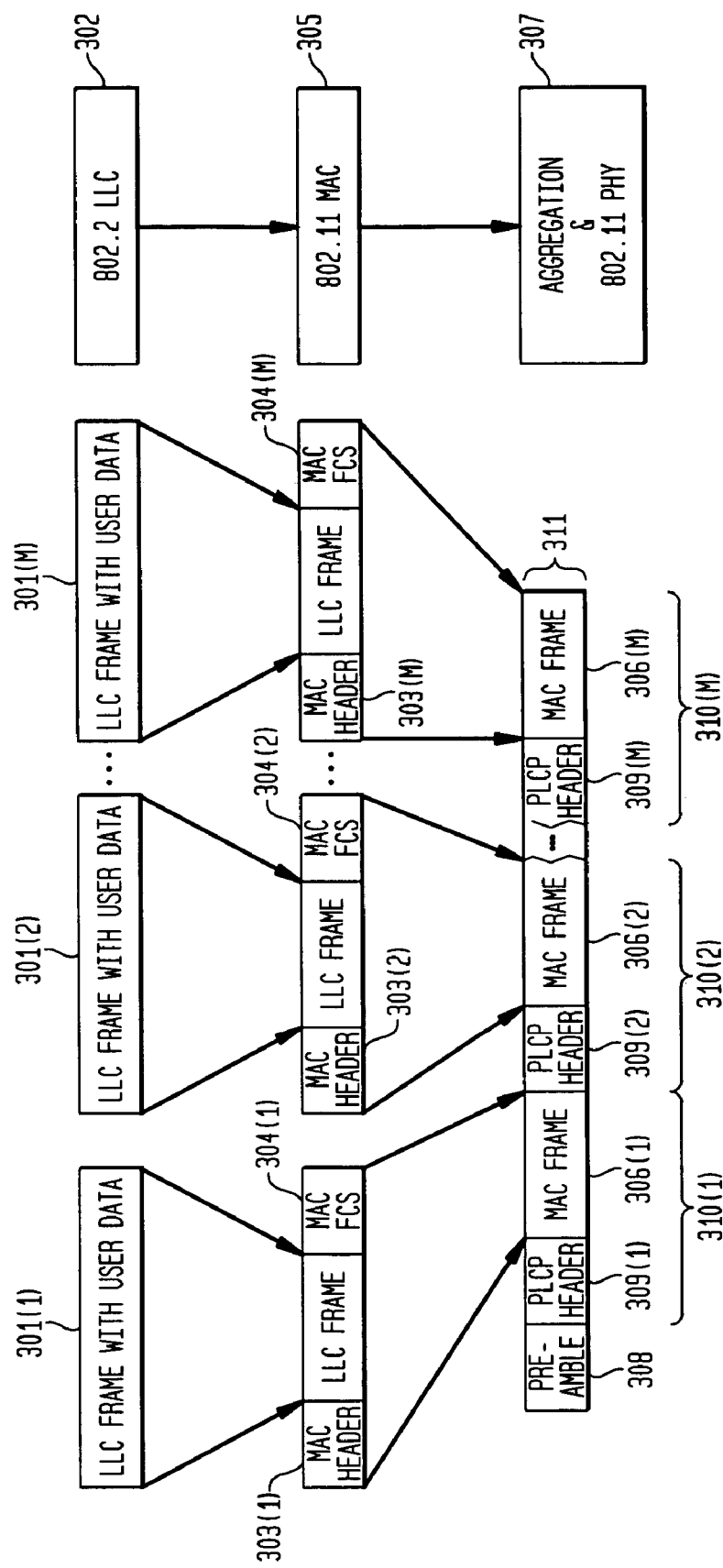
FIG. 3 shows another exemplary frame aggregation method.

FIG. 3 shows another exemplary frame aggregation method disclosed in the '947 and '943 applications. More specifically, frame aggregation of FIG. 3 is performed within the PHY layer by concatenating multiple PHY frames without duplicating the preamble. Frame aggregation of FIG. 3 enables transmission of individual MAC frames with different data rates. For some implementations, the included MAC frames might be ordered in accordance with increasing data rate so that STAs having relatively poor channel conditions can correctly receive the lower data rates.

LLC frames 301(1) through 301(M) of LLC layer 302 are passed to MAC layer 305. MAC layer 305 appends a MAC header 303(n) and a MAC FCS 304(n) to LLC frame 301(n) to form a MAC sub-frame 306(n). MAC sub-frames 306(1) through 306(M) are then passed to PHY layer 307. PHY layer 307 appends a PCLP header 309(n) to each corresponding MAC sub-frame 306(n) to form a PHY sub-frame 310(n).

PHY sub-frames 310(1) through 310(M) are concatenated and a preamble 308 is appended to the concatenated PHY sub-frames to form a PHY packet 311.

The aggregation methods illustrated in FIGS. 2 and 3 can be practiced, for example, in a data network or an entertainment network. A data network usually has an AP and several STAs associated with that AP, wherein each source device (e.g., an STA or the AP) usually has a limited number of MAC frames to be transmitted to the same destination device. As a result, the aggregate frame, e.g., aggregate MAC frame 210 (FIG. 2), usually has MAC frames for different destinations, with the destination for each MAC frame specified in the frame's MAC header, e.g., MAC header 203 (FIG. 2). In contrast, an entertainment network usually has paired source and destination devices (e.g., a DVD player and an LCD screen), wherein a relatively large amount of data is transmitted from the particular source device to the counterpart destination device. As a result, the aggregate frame, e.g., aggregate MAC frame 210 (FIG. 2), usually has multiple MAC frames, e.g., frames 216($n$), for the same destination. Although the aggregation methods of FIGS. 2 and 3 improve the efficiency for the entertainment network compared to that achieved with prior-art methods, it is still possible to further improve the entertainment network's efficiency by, e.g., reducing the amount of redundant information contained in MAC headers 203($n$) (FIG. 2).

Figure 4A:
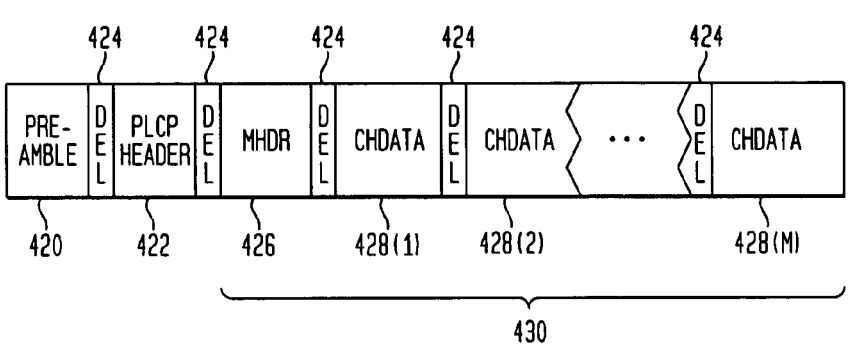
FIGS. 4A-C show an aggregate-frame format according to one embodiment of the present invention.
Figure 4B:
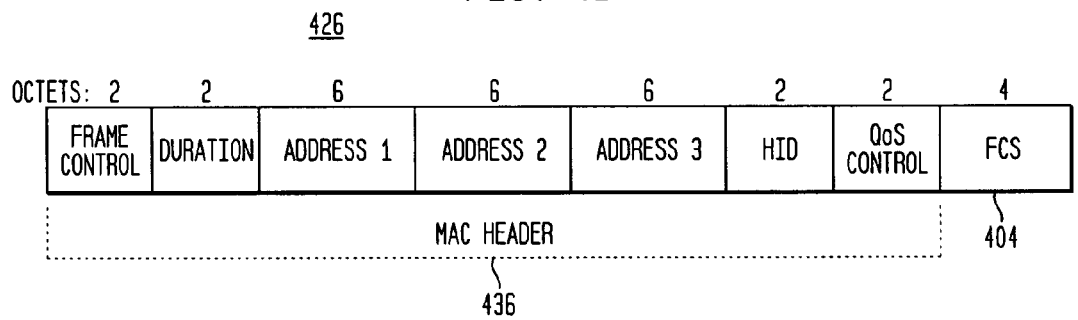
Figure 4C:
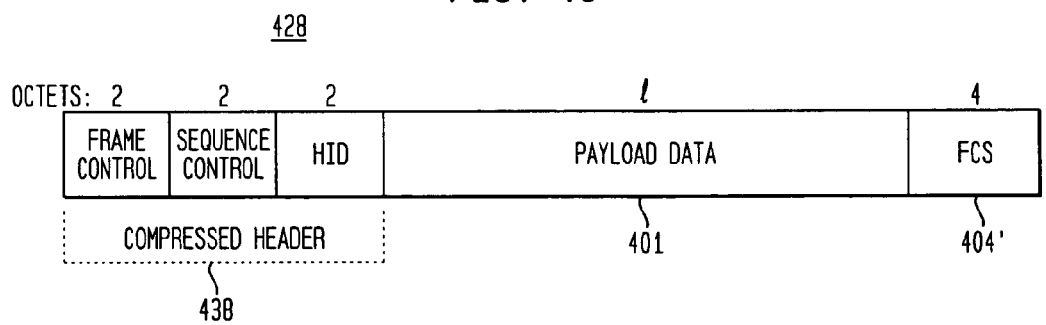

FIGS. 4A-C show an aggregate-frame format according to one embodiment of the present invention. More specifically, the aggregate-frame format of FIGS. 4A-C can be used in aggregation methods derived based on those shown in FIGS. 2 and 3, which methods are described in more detail below. FIG. 4A shows a PHY packet 418 that can be transmitted similar to PHY packet 212 (FIG. 2) or PHY packet 311 (FIG. 3), and FIGS. 4B-C show a MAC header (MHDR) unit 426 and a compressed header data (CHDATA) unit 428, respectively, of PHY packet 418. MHDR unit 426 carries MAC header information that applies to CHDATA units 428(1) through 428(M), which are all intended for the same destination. Because each CHDATA unit 428($n$) no longer carries the information present in MHDR unit 426, the MAC header overhead in PHY packet 418 is reduced, e.g., compared to that in PHY packet 212 (FIG. 2).

Referring to FIG. 4A, PHY packet 418 has a preamble 420, a PLCP header 422, MHDR unit 426, and CHDATA units 428(1) through 428(M). Preamble 420 and PLCP header 422 might be similar to, e.g., preamble 213 and PLCP header 214, respectively, of FIG. 2. Preamble 420, PLCP header 422, MHDR unit 426, and CHDATA units 428 are separated by delimiters 424 as shown in the figure. In general, delimiter 424 can have any predetermined combination of bits that is recognized by the system as a signal that marks the end of preamble 420, PLCP header 422, MHDR unit 426, or a non-terminal CHDATA unit 428($n$) (where n≠M). MHDR unit 426, CHDATA units 428(1) through 428(M), and the corresponding delimiters 424 form an aggregate MAC frame 430.

Referring to FIG. 4B, MHDR unit 426 has a MAC header portion 436 and an FCS 404. MAC header portion 436 has the following fields: Frame Control, Duration, Addresses 1 through 3, Header Identity (HID), and QoS Control, with the number above the field in FIG. 4B indicating the field's length in bytes. Of these fields, the Frame Control, Duration, Address 1, Address 2, Address 3, and QoS Control fields are analogous to the corresponding fields of a regular 802.11 MAC header described in the IEEE 802.11 family of standards, and the HID field is a new optional field. More specifically, the HID field can be used to match MHDR unit 426 with CHDATA units 428 at the receiver. FCS 404 is a regular MAC FCS similar to, e.g., FCS 204 (FIG. 2). Note that, in a regular 802.11 MAC frame, e.g., MAC frame 216($n$) of FIG. 2, the FCS protects the MAC header, e.g., MAC header 203($n$) of FIG. 2, together with the payload, e.g., LLC frame 201($n$) of FIG. 2. In contrast, in MHDR unit 426, which has no payload data, FCS 404 specifically protects MAC header portion 436. In addition, the Frame Control field of MAC header portion 436 has specific Type and Subtype values that identify MHDR unit 426 as such, i.e., as a unit that has (i) MAC header information for the corresponding CHDATA units and (ii) no payload data of its own.

Referring to FIG. 4C, CHDATA unit 428 has a compressed header portion 438, a payload data portion 401, and an FCS 404'. Compressed header portion 438 has the following fields: Frame Control, Sequence Control, and HID, with the number above the field in FIG. 4C indicating the field's length in bytes. Of these fields, the Frame Control and Sequence Control fields are analogous to the corresponding fields of a regular 802.11 MAC header described in the IEEE 802.11 family of standards. The HID field of compressed header portion 438 is analogous to the HID field of MAC header portion 436 and is used to match CHDATA unit 428 with MHDR unit 426. FCS 404' is a regular MAC FCS similar to, e.g., FCS 204 (FIG. 2). Since CHDATA unit 428 has payload data portion 401, FCS 404' protects compressed header portion 438 together with the payload data portion. The Frame Control field of compressed header portion 438 has specific Type and Subtype values that identify CHDATA unit 428 as such, i.e., as a unit that has a compressed header portion, the information of which has to be complemented with the MAC header information from the corresponding MHDR unit to correctly process the payload data portion.

At the receiver, the full regular 802.11 MAC header for payload data portion 401, which portion is analogous to, e.g., LLC frame 201 of FIG. 2, can be reconstructed, for example, as follows. The values of HID fields in MAC header portion 436 of MHDR unit 426 and compressed header portion 438 of CHDATA unit 428 are first used to match the two units to one another. Then, the values in the remaining fields of MAC header portion 436 and compressed header portion 438 are used to derive the corresponding field values for the full regular MAC header. Using the reconstructed full regular MAC header, the receiver can then proceed with processing of payload data portion 401 in a customary manner.

Figure 5:
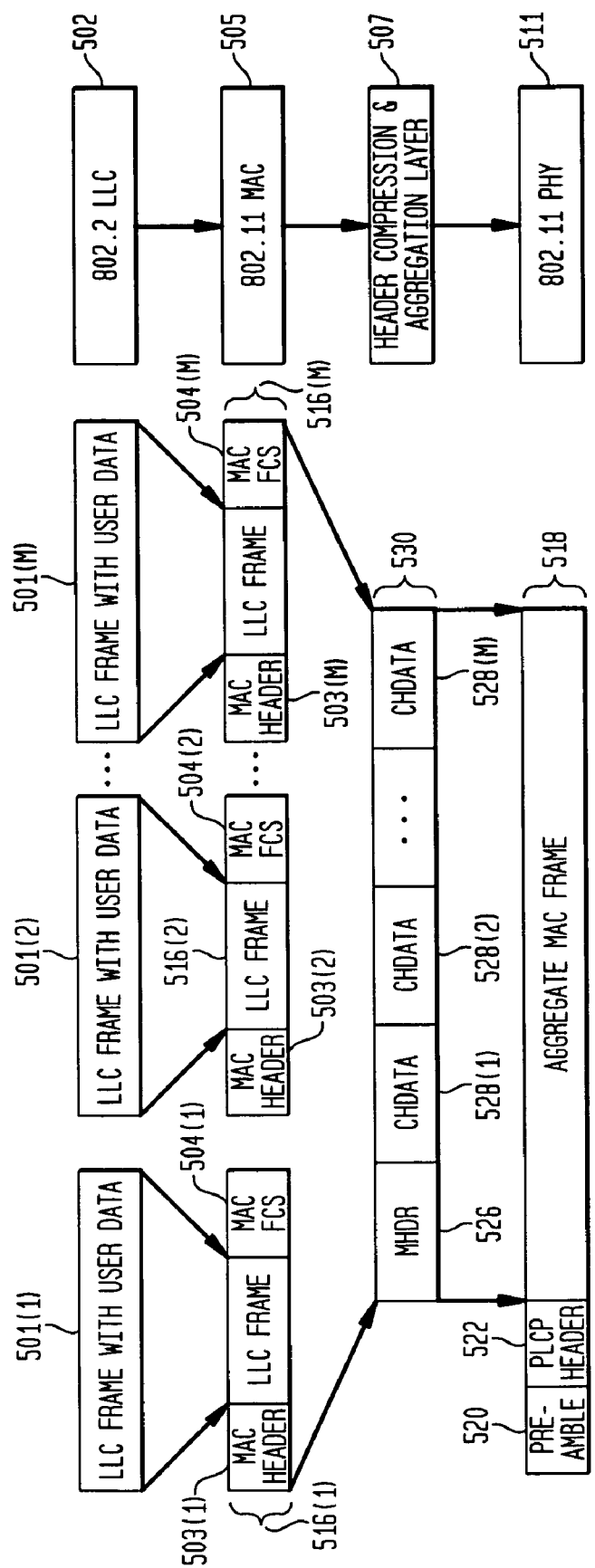
FIG. 5 shows a frame aggregation method that uses the aggregate-frame format of FIG. 4 according to one embodiment of the present invention.

FIG. 5 shows a frame aggregation method that uses the aggregate-frame format of FIG. 4 according to one embodiment of the present invention. Similar to the frame aggregation method of FIG. 2, frame aggregation in the method of FIG. 5 is performed below MAC layer 505 by processing regular MAC frames to form an aggregate MAC frame having an MHDR unit and one or more CHDATA units. The aggregate MAC frame is then processed by PHY layer 511 to form a corresponding PHY packet. However, one difference between the frame aggregation methods of FIGS. 2 and 5 is that, while in the former, different MAC sub-frames in the aggregate MAC frame can be sent to different destinations, in the latter, all CHDATA units are intended for the same destination specified in the MHDR unit.

LLC frames 501(1) through 501(M), M a positive integer, at LLC layer 502, are passed to MAC layer 505. Each LLC frame 501($n$) ($1 \leq n \leq M$) is formed into a MAC sub-frame 516($n$) by appending a MAC header 503($n$) and a MAC FCS 504($n$), wherein each of MAC headers 503($n$) specifies the same destination address. MAC sub-frames 516(1) through 516(M) are then processed at intermediate header-compression and aggregation layer 507 to produce an aggregate MAC frame 530. Aggregate MAC frame 530 is analogous to aggregate MAC frame 430 (FIG. 4A) and has an MHDR unit 526 and CHDATA units 528(1) through 528(M). MHDR unit 526 is analogous to MHDR unit 426 of FIG. 4, and each CHDATA unit 528(n) is analogous to CHDATA unit 428 of FIG. 4. As such, the MAC header portion of MHDR unit 526 has MAC header information that applies to each CHDATA unit 528(n). The compressed header portion of CHDATA unit 528(n) has the MAC header information specific to MAC sub-frame 516(n), which information, when processed together with the MAC header information of MHDR unit 526, enables the receiver to reconstruct MAC header 503(n). The payload data portion of CHDATA unit 528(n) has the user data of LLC frame 501(n). PHY layer 511 forms a PHY packet 518 from aggregate MAC frame 530 by appending a preamble 520 and a PLCP header 522, wherein PHY packet 518, preamble 520, and PLCP header 522 are analogous to PHY packet 418, preamble 420, and PLCP header 422, respectively, of FIG. 4.

In one embodiment, the transmitting STA or AP may include multiple copies of MHDR unit 526 into aggregate MAC frame 530 to increase robustness in case of loss of one or more copies of the MHDR unit due to transmission errors. The additional copies of MHDR unit 526 may be located anywhere within the sequence of CHDATA units 528(n), subject to certain ordering restrictions for units having different HID values, which restrictions are outlined in more detail below. The transmitting STA or AP may perform MAC-header compression per destination and per Traffic Class (TC) separately. Retransmissions of a CHDATA unit 528, which has been lost due to transmission errors, may be performed as a regular uncompressed MAC frame or, again, as a CHDATA unit.

A receiving STA or AP determines whether MAC-header compression has been used based on the Type and Subtype values in the Frame Control field of the received MHDR and CHDATA units. The receiver uses the appropriate fields from MHDR unit 526 and the compressed header portion of CHDATA unit 528(n) to recreate MAC sub-frame 516(n). MHDR unit 526 does not need to be acknowledged by the receiving STA or AP. The acknowledgement policy for CHDATA units 528 is defined in the QoS field of the corresponding MHDR unit 526. When acknowledgement of CHDATA units 528 is required, the existing 802.11 Block ACK scheme might be invoked. A retransmitted CHDATA unit 528 is processed based on the value in the Sequence Control field of the compressed header portion, which indicates the proper position of said CHDATA unit within the previously received sequence of CHDATA units. A CHDATA unit is discarded, when, based on the value in the HID field, no corresponding MHDR unit is found in the aggregate frame.

A CHDATA unit 528 having a particular HID value is preferably preceded by at least one MHDR unit 526 having the same HID value. Only a single MHDR unit 526 of aggregate MAC frame 530 per HID value needs to be correctly received to enable the receiver to reconstruct the sequence of MAC sub-frames 516(n) having that HID value. For ease of implementation, it might be preferred that no MHDR unit having a different HID value occurs between CHDATA unit 528 and its matching MHDR unit 526. Within a single aggregate MAC frame 530, MHDR units that do not carry the same MAC header informetion are assigned different HID values.

Compared to the aggregation method of FIG. 2, the aggregation method of FIG. 5 is capable of reducing the overall overhead by as much as about 15%, with most of the reduction coming from the reduction of the overhead associated with the MAC header. For example, simulations showed that, for MAC sub-frames 516 having a size of 188 bytes and a Gaussian communication channel having a bit-error rate (BER) between about $10^{-6}$ and $10^{-3}$, the overhead reduction is between about 4 and 15%.

Figure 6:
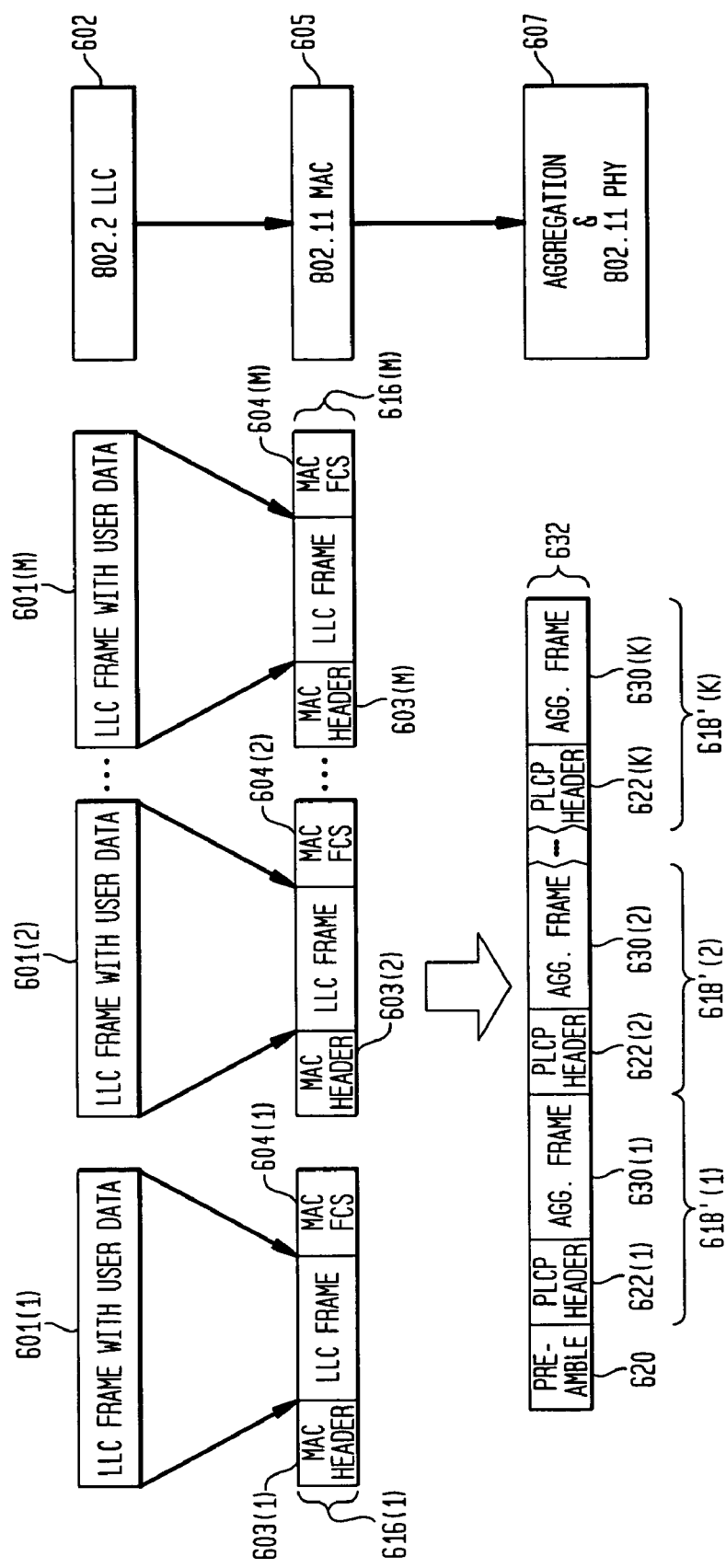
FIG. 6 shows a frame aggregation method that uses the aggregate-frame format of FIG. 4 according to another embodiment of the present invention.

FIG. 6 shows a frame aggregation method that uses the aggregate-frame format of FIG. 4 according to another embodiment of the present invention. Frame aggregation in the method of FIG. 6 is performed within aggregation and PHY layer 607 by first forming multiple PHY sub-packets, each of which is analogous to PHY packet 418 (FIG. 4A), and then concatenating those sub-packets, without duplicating the preamble, to form a PHY packet 632, which is transmitted over the communication medium.

In one embodiment, the processing within LLC layer 602 and MAC layer 605 is analogous to the processing within LLC layer 502 and MAC layer 505 (FIG. 5), respectively. More specifically, LLC frames 601(1) through 601(M) are passed from LLC layer 602 to MAC layer 605, wherein each LLC frame 601(n) is formed into a MAC sub-frame 616(n) by appending a MAC header 603(n) and a MAC FCS 604(n). MAC headers 603(n) correspond to the same destination. MAC sub-frames 616(1) through 616(M) are passed to aggregation and PHY layer 607, where they are first sorted and grouped. MAC sub-frames 616 within the same group have the same destination. Each group of MAC sub-frames is then processed to form an aggregate MAC frame 630, which is analogous, e.g., to aggregate MAC frame 530 (FIG. 5). Aggregation and PHY layer 607 then (A) appends a PLCP header 622(i) to each aggregate MAC frame 630(i) ($1 \leq i \leq K$) to form the corresponding PHY sub-packet 618'(i), (B) concatenates the K resulting PHY sub-packets 618', and (C) adds a preamble 620 to form PHY packet 632. The maximum length (duration) of PHY packet 632 might be limited by the maximum available 802.11 burst size of 3 ms.

At the receiver, MAC header 603(n) for LLC frame 601(n) can be reconstructed, for example, as follows. The values of the HID fields in the MHDR and CHDATA units of the received aggregate MAC frame 630(i) corresponding to LLC frame 601(n) are first used to match the MHDR and CHDATA units to one another. Then, the MAC header portion of the MHDR unit and the compressed header portion of the CHDATA unit are used to reconstruct MAC header 603(n). Finally, using the reconstructed MAC header, the receiver processes the payload of the CHDATA unit in a customary manner to recover the user data.

While this invention has been described with reference to illustrative embodiments, this description is not intended to be construed in a limiting sense. Various modifications of the described embodiments, as well as other embodiments of the invention, which are apparent to persons skilled in the art to which the invention pertains are deemed to lie within the principle and scope of the invention as expressed in the following claims.

Although the steps in the following method claims, if any, are recited in a particular sequence with corresponding labeling, unless the claim recitations otherwise imply a particular sequence for implementing some or all of those steps, those steps are not necessarily intended to be limited to being implemented in that particular sequence.

The present invention may be implemented as circuit-based processes, including possible implementation on a single integrated circuit. As would be apparent to one skilled in the art, various functions of circuit elements may also be implemented as processing steps in a software program. Such software may be employed in, for example, a digital signal processor, micro-controller, or general-purpose computer.

The present invention can be embodied in the form of methods and apparatuses for practicing those methods. The present invention can also be embodied in the form of program code embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

What is claimed is:

1. A method of generating an aggregate PHY frame for one or more MAC sub-frames, the method comprising:
    (a) generating a MAC header unit from headers of a first set from said one or more MAC sub-frames, the MAC header unit having header information applicable to each MAC sub-frame in the first set;
    (b) for each MAC sub-frame in the first set, generating a compressed-header data unit having a compressed header portion and a payload data portion; and
    (c) forming the aggregate PHY frame containing the generated MAC header unit and the generated one or more compressed-header data units, wherein:
    the MAC header unit has (i) a frame control field and (ii) a frame check sequence (FCS) having error detection/correction information for the MAC header unit; and
    each of the one or more compressed-header data units has (i) a respective frame control field and (ii) a respective frame check sequence (FCS) having error detection/correction information for the compressed-header data unit;
    wherein the MAC header unit has no user data.

2. The invention of claim 1, wherein for each MAC sub-frame in step (b):
    the compressed header portion has header information applicable to the MAC sub-frame; and
    the payload data portion has the user data of the MAC sub-frame.

3. The invention of claim 1, wherein all MAC sub-frames in the first set are intended for a single destination.

4. The invention of claim 1, wherein, for each MAC sub-frame in the first set:
    the compressed header portion of the corresponding compressed-header data unit has less than all of the header information of the corresponding MAC sub-frame; and
    said compressed header portion and the MAC header unit together have all of the header information of said corresponding MAC sub-frame.

5. The invention of claim 1, wherein each of the MAC header unit and the compressed header portion has a header identity (HID) field, which enables matching of the MAC header unit to one or more of the corresponding compressed-header data units in the aggregate PHY frame.

6. The invention of claim 1, further comprising duplicating the MAC header unit at least one time.

7. The invention of claim 6, wherein step (c) comprises ordering the positions of the MAC header units and the one or more compressed-header data units such that at least one copy of the MAC header unit precedes all corresponding compressed-header data units.

8. The invention of claim 1, wherein step (c) comprises:
    generating a sequence from the MAC header unit and the one or more compressed-header data units; and
    inserting a delimiter between each two adjacent units.

9. The invention of claim 1, wherein the compressed header portion further comprises a sequence control field indicating the position of the corresponding MAC sub-frame relative to other MAC sub-frames of the first set.

10. The invention of claim 1, further comprising forming a physical layer packet using the aggregate PHY frame.

11. The invention of claim 10, further comprising transmitting the physical layer packet through a medium.

12. The invention of claim 10, wherein forming the physical layer packet comprises appending a packet preamble and a packet header to the aggregate PHY frame.

13. The invention of claim 1, wherein the method is implemented as steps in a processor of an integrated circuit (IC).

14. The invention of claim 13, wherein the IC is embodied in a device operating in accordance with an IEEE 802.11 standard.

15. The invention of claim 1, wherein:
    said one or more MAC sub-frames comprise two or more MAC sub-frames; and
    the method further comprises:
        repeating steps (a) and (b) for each of one or more additional sets from said one or more MAC sub-frames; and
        for each of said one or more additional sets, generating a sequence from the corresponding MAC header unit and compressed-header data units.

16. The invention of claim 15, further comprising:
    concatenating the generated sequences to form the aggregate PHY frame; and
    forming a physical layer packet using the aggregate PHY frame, wherein forming the physical layer packet comprises appending a packet preamble and a packet header to the aggregate PHY frame.

17. The invention of claim 15, further comprising:
    for each sequence, forming a physical layer sub-packet using the sequence; and
    forming a physical layer packet using the sub-packets.

18. The invention of claim 1, wherein:
    the frame control field of the MAC header unit complies with an IEEE 802.11 standard and has a type value and a subtype value that identify said MAC header unit as a MAC header unit; and
    for each of the one or more compressed-header data units, the respective frame control field of the compressed-header data unit complies with the IEEE 802.11 standard and has a type value and a subtype value that identify said compressed-header data unit as a compressed-header data unit.

19. Apparatus for generating an aggregate PHY frame for one or more MAC sub-frames, the apparatus comprising:
    a first circuit adapted to generate a MAC header unit from headers of a first set from said one or more MAC sub-frames, the MAC header unit having header information applicable to each MAC sub-frame in the first set; and
    a second circuit adapted to, for each MAC sub-frame in the first set, generate a compressed-header data unit having a compressed header portion and a payload data portion, wherein:

the aggregate PHY frame contains the generated MAC header unit and the generated one or more compressed-header data units;

the MAC header unit has (i) a frame control field and (ii) a frame check sequence (FCS) having error detection/correction information for the MAC header unit; and each of the one or more compressed-header data units has (i) a respective frame control field and (ii) a respective frame check sequence (FCS) having error detection/correction information for the compressed-header data unit;

wherein the MAC header unit has no user data.

20. The invention of claim 19, wherein:

the frame control field of the MAC header unit complies with an IEEE 802.11 standard and has a type value and a subtype value that identify said MAC header unit as a MAC header unit; and for each of the one or more compressed-header data units, the respective frame control field of the compressed-header data unit complies with the IEEE 802.11 standard and has a type value and a subtype value that identify said compressed-header data unit as a compressed-header data unit.

21. A method of processing a packet by a receiving device, the method comprising:

receiving a physical layer packet having an aggregate PHY frame corresponding to one or more MAC sub-frames, wherein:

the aggregate PHY frame comprises a MAC header unit and, for each of the one or more MAC sub-frames, a corresponding compressed-header data unit;

the MAC header unit has header information applicable to each of the one or more MAC sub-frames; and each compressed-header data unit has a compressed header portion and a payload data portion; and based on the MAC header unit and a compressed-header data unit of the aggregate PHY frame, reconstructing the corresponding MAC sub-frame of the one or more MAC sub-frames, wherein:

the MAC header unit has (i) a frame control field and (ii) a frame check sequence (FCS) having error detection/correction information for the MAC header unit; and each of the one or more compressed-header data units has (i) a respective frame control field and (ii) a respective frame check sequence (FCS) having error detection/correction information for the compressed-header data unit;

wherein the MAC header unit has no user data.

22. The invention of claim 21, wherein:

the compressed header portion of a compressed-header data unit has header information specific to the corresponding MAC sub-frame; and the payload data portion of said compressed-header data unit has the user data of said corresponding MAC sub-frame.

23. The invention of claim 21, wherein the header information in the MAC header unit is information common to headers of the one or more MAC sub-frames.

24. The invention of claim 21, wherein:

each of the MAC header unit and the compressed header portion has a header identity (HID) field; and the method comprises matching the MAC header unit to the corresponding compressed-header data unit using a value in the HID field.

25. The invention of claim 21, further comprising for each of the MAC header unit and the compressed-header data units, correcting one or more errors based on the error detection/correction information.

26. The invention of claim 21, wherein the compressed header portion comprises a sequence control field indicating the position of the corresponding MAC sub-frame with respect to other MAC sub-frames of the one or more MAC sub-frames.

27. The invention of claim 21, wherein the method is implemented as steps in a processor of an integrated circuit (IC).

28. The invention of claim 27, wherein the IC is embodied in a device operating in accordance with an IEEE 802.11 standard.

29. The invention of claim 21, wherein:

the frame control field of the MAC header unit complies with an IEEE 802.11 standard and has a type value and a subtype value that identify said MAC header unit as a MAC header unit; and for each of the one or more compressed-header data units, the respective frame control field of the compressed-header data unit complies with the IEEE 802.11 standard and has a type value and a subtype value that identify said compressed-header data unit as a compressed-header data unit.

30. A receiving device for processing a packet, the device comprising:

a first circuit adapted to receive a physical layer packet having an aggregate PHY frame corresponding to one or more MAC sub-frames, wherein:

the aggregate PHY frame comprises a MAC header unit and, for each of the one or more MAC sub-frames, a corresponding compressed-header data unit;

the MAC header unit has header information applicable to each of the one or more MAC sub-frames; and each compressed-header data unit has a compressed header portion and a payload data portion; and a second circuit adapted to, based on the MAC header unit and a compressed-header data unit of the aggregate PHY frame, reconstruct the corresponding MAC sub-frame of the one or more MAC sub-frames, wherein:

the MAC header unit has (i) a frame control field and (ii) a frame check sequence (FCS) having error detection/correction information for the MAC header unit; and each of the one or more compressed-header data units has (i) a respective frame control field and (ii) a respective frame check sequence (FCS) having error detection/correction information for the compressed-header data unit;

wherein the MAC header unit has no user data.

31. The invention of claim 30, wherein:

the frame control field of the MAC header unit complies with an IEEE 802.11 standard and has a type value and a subtype value that identify said MAC header unit as a MAC header unit; and for each of the one or more compressed-header data units, the respective frame control field of the compressed-header data unit complies with the IEEE 802.11 standard and has a type value and a subtype value that identify said compressed-header data unit as a compressed-header data unit.

32. A tangible computer-readable medium having stored thereon a plurality of instructions, the plurality of instructions including instructions which, when executed by a processor, cause the processor to implement a method of generating an aggregate PHY frame for one or more MAC sub-frames, the method comprising:

(a) generating a MAC header unit from headers of a first set from said one or more MAC sub-frames, the MAC header unit having header information applicable to each MAC sub-frame in the first set;

(b) for each MAC sub-frame in the first set, generating a compressed-header data unit having a compressed header portion and a payload data portion; and (c) forming the aggregate PHY frame containing the generated MAC header unit and the generated one or more compressed-header data units, wherein:

the MAC header unit has (i) a frame control field and (ii) a frame check sequence (FCS) having error detection/correction information for the MAC header unit; and each of the one or more compressed-header data units has (i) a respective frame control field and (ii) a respective frame check sequence (FCS) having error detection/correction information for the compressed-header data unit;

wherein the MAC header unit has no user data.

33. The invention of claim 32, wherein:

the frame control field of the MAC header unit complies with an IEEE 802.11 standard and has a type value and a subtype value that identify said MAC header unit as a MAC header unit; and for each of the one or more compressed-header data units, the respective frame control field of the compressed-header data unit complies with the IEEE 802.11 standard and has a type value and a subtype value that identify said compressed-header data unit as a compressed-header data unit.

34. A tangible computer-readable medium having stored thereon a plurality of instructions, the plurality of instructions including instructions which, when executed by a processor, cause the processor to implement a method of processing a packet by a receiving device, the method comprising:

receiving a physical layer packet having an aggregate PHY frame corresponding to one or more MAC sub-frames, wherein:

the aggregate PHY frame comprises a MAC header unit and, for each of the one or more MAC sub-frames, a corresponding compressed-header data unit;

the MAC header unit has header information applicable to each of the one or more MAC sub-frames; and each compressed-header data unit has a compressed header portion and a payload data portion; and based on the PHY header unit and a compressed-header data unit of the aggregate PHY frame, reconstructing the corresponding MAC sub-frame of the one or more MAC sub-frames, wherein:

the MAC header unit has (i) a frame control field and (ii) a frame check sequence (FCS) having error detection/correction information for the MAC header unit; and each of the one or more compressed-header data units has (i) a respective frame control field and (ii) a respective frame check sequence (FCS) having error detection/correction information for the compressed-header data unit;

wherein the MAC header unit has no user data.

35. The invention of claim 34, wherein:

the frame control field of the MAC header unit complies with an IEEE 802.11 standard and has a type value and a subtype value that identify said MAC header unit as a MAC header unit; and for each of the one or more compressed-header data units, the respective frame control field of the compressed-header data unit complies with the IEEE 802.11 standard and has a type value and a subtype value that identify said compressed-header data unit as a compressed-header data unit.

* * * * *

UNITED STATES PATENT AND TRADEMARK OFFICE
CERTIFICATE OF CORRECTION

PATENT NO. : 7,633,970 B2 Page 1 of 1
APPLICATION NO. : 11/019581
DATED : December 15, 2009
INVENTOR(S) : Harald van Kampen and Richard van Leenuwen It is certified that error appears in the above-identified patent and that said Letters Patent is hereby corrected as shown below:

In Item (56) References Cited, Other publications, please add ""802.11a Modeling and MAC Enhancements for High Speed Rate Adaptive Networks" by Ka Yeung, December 12, 2002, UCLA, 19 pages.".

Signed and Sealed this

Thirty-first Day of August, 2010

David J. Kappos
*Director of the United States Patent and Trademark Office*

UNITED STATES PATENT AND TRADEMARK OFFICE
CERTIFICATE OF CORRECTION

PATENT NO. : 7,633,970 B2 Page 1 of 1
APPLICATION NO. : 11/019581
DATED : December 15, 2009
INVENTOR(S) : van Kampen et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1095 days.

Signed and Sealed this

Twenty-first Day of December, 2010

David J. Kappos
*Director of the United States Patent and Trademark Office*